(12) United States Patent
Hashemzadeh

(10) Patent No.: US 9,090,795 B2
(45) Date of Patent: Jul. 28, 2015

(54) METHOD FOR PRODUCING COMPOSITE PARTICLES

(75) Inventor: Abdulmajid Hashemzadeh, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 832 days.

(21) Appl. No.: 12/921,769

(22) PCT Filed: Feb. 26, 2009

(86) PCT No.: PCT/EP2009/052249
§ 371 (c)(1),
(2), (4) Date: Sep. 9, 2010

(87) PCT Pub. No.: WO2009/112370
PCT Pub. Date: Sep. 17, 2009

(65) Prior Publication Data
US 2011/0015340 A1 Jan. 20, 2011

(30) Foreign Application Priority Data
Mar. 10, 2008 (DE) .......................... 10 2008 000 584

(51) Int. Cl.
| | |
|---|---|
| C08J 3/14 | (2006.01) |
| C09J 143/04 | (2006.01) |
| C14C 11/00 | (2006.01) |
| C09D 143/04 | (2006.01) |
| C09D 183/04 | (2006.01) |
| C09D 7/12 | (2006.01) |
| C08L 83/04 | (2006.01) |
| C08L 83/06 | (2006.01) |
| C08L 83/08 | (2006.01) |
| C09D 5/03 | (2006.01) |
| C08K 5/54 | (2006.01) |

(52) U.S. Cl.
CPC ................. *C09D 143/04* (2013.01); *C08J 3/14* (2013.01); *C08K 5/54* (2013.01); *C08L 83/04* (2013.01); *C08L 83/06* (2013.01); *C08L 83/08* (2013.01); *C09D 5/033* (2013.01); *C09D 7/125* (2013.01); *C09D 183/04* (2013.01); *C09J 143/04* (2013.01); *C14C 11/003* (2013.01); *C08J 2383/04* (2013.01); *C08L 2666/04* (2013.01)

(58) Field of Classification Search
CPC ........ C08J 3/14; C08J 2383/04; C09J 143/04; C09D 183/04; C09D 143/04; C09D 7/125; C09D 5/033; C08L 83/04; C08L 83/06; C08L 83/08; C08L 2666/04; C08K 5/54; C08K 5/548; C14C 11/003
USPC ........................................................ 524/261
See application file for complete search history.

(56) References Cited

U.S. PATENT DOCUMENTS

| | | | |
|---|---|---|---|
| 3,544,500 A | 12/1970 | Osmond et al. | |
| 4,421,660 A | 12/1983 | Solc nee Hajna | |
| 4,997,859 A | 3/1991 | Min et al. | |
| 5,868,966 A | 2/1999 | Wei et al. | |
| 6,517,941 B1 * | 2/2003 | Murase ........................ | 428/412 |
| 7,538,153 B2 * | 5/2009 | Bacher et al. .................. | 524/503 |
| 7,723,424 B2 * | 5/2010 | Hashemzadeh et al. ...... | 524/503 |
| 2003/0044611 A1 | 3/2003 | Stark et al. | |
| 2003/0099844 A1 | 5/2003 | Hanahata et al. | |
| 2006/0194006 A1 | 8/2006 | Bacher et al. | |
| 2007/0161740 A1 | 7/2007 | Wiese et al. | |
| 2008/0051500 A1 | 2/2008 | Wiese | |
| 2008/0098933 A1 | 5/2008 | Killat | |
| 2008/0281035 A1 | 11/2008 | Hashemzadeh et al. | |

FOREIGN PATENT DOCUMENTS

| | | |
|---|---|---|
| DE | 101 40 131 A1 | 4/2003 |
| DE | 10 2004 010 155 A1 | 9/2005 |
| DE | 10 2006 050 336 A1 | 5/2008 |
| DE | 10 2007 038 333 A1 | 2/2009 |
| EP | 0 528 038 A1 | 2/1993 |

(Continued)

OTHER PUBLICATIONS

English abstract for JP2004292555.
English abstract for JP10330488.
English abstract for JP2002155209.
English abstract for JP3281679.
English abstract for JP4645196B.

(Continued)

*Primary Examiner* — Angela C Scott
(74) *Attorney, Agent, or Firm* — RatnerPrestia

(57) ABSTRACT

The object of the invention are methods for producing composite particles, characterized in that α) one or more silicon compounds of the general formula: $(RO)_n SiR^1_{4-n}$ (1), wherein R denotes an optionally substituted alkyl or aryl residue having 1 to 20 carbon atoms or a hydrogen atom, R1 denotes an optionally substituted hydrocarbon residue or a hydrogen atom, and n assumes a value of 1 to 4, or β) one or more condensation products of the silicon compounds of formula (1) are condensed in the presence of one or more soluble polymers in a solvent or a mixture of multiple solvents, wherein said soluble polymers are obtainable by radically initiated polymerization of a) one or more ethylenic unsaturated monomers having one or more further functional group selected from the group comprising carboxyl groups or the derivatives thereof, silane, sulfonic acid, sulfate, phosphate, phosphonate, isocyanate, amine, quaternized amine, hydrazine, epoxy, ether, hydroxyl, or CO groups, and b) one or more ethylenic unsaturated monomers selected from the group comprising vinyl esters of carboxylic acids having 1 to 15 C atoms, methacrylic acid esters or acrylic acid esters of carboxylic acids with branched or unbranched alcohols having 1 to 15 C atoms, olefins and dienes, vinyl aromatics and vinyl halides, and wherein condensation products thus formed of said silicon compounds α) or condensation products β) or the condensation products thereof are fixed on one or more soluble polymers.

8 Claims, No Drawings

(56) References Cited

FOREIGN PATENT DOCUMENTS

| EP | 1 243 619 | A1 | 9/2002 |
|---|---|---|---|
| EP | 1 620 271 | B1 | 9/2006 |
| JP | 03281679 | A | 12/1991 |
| JP | 3281679 | A2 | 12/1991 |
| JP | 10330488 | A2 | 12/1998 |
| JP | 2002155209 | A2 | 5/2002 |
| JP | 2004292555 | A2 | 10/2004 |
| JP | 4645196B | B2 | 3/2011 |
| WO | WO 2004/003081 | A1 | 1/2004 |
| WO | WO 2006/072464 | A1 | 7/2006 |
| WO | WO 2007/057382 | A1 | 5/2007 |
| WO | WO 2009/021929 | A1 | 2/2009 |

OTHER PUBLICATIONS

Bartl, Herbert & Falbe, Jürgen; "Methoden Der Organischen Chemie"; Handbook; vol. E20; 1987; 5 pp; Georg Thieme Verlag, Stuttgart, Germany, Houben-Weyl series.

Bauer, Frank, "Nano/Micro Particle Hybrid Composites for Scratch and Abrasion Resistant Polyacrylate Coatings," *Macromol. Mater. Eng.*, 2006, 291 493-498.

Campos, Genaro, et al., "Development of New Carpet Backings Based on Composite Polymer Particles," *J. of Reinforced Plastics and Composites*, vol. 25:18, pp. 1897-1901.

Fox, T. G.; #J5—"Influence of Diluent and of Copolymer Composition on the Glass Temperature of a Polymer System"; Bulletin American Physics Society; vol. 1; 1956; p. 123 (1 p).

Lee, W. A. & Rutherford, R. A.; "The Glass Transition Temperatures of Polymers"; Polymer Handbook, $2^{nd}$ Edition; 1975; 53 pp.; J. Wiley & Sons, New York.

Mizutani, Tsutomu, et al., "Preparation of Spherical Nanocomposites Consisting of Silica Core and Polyacrylate Shell by Emulsion Polymerization," *J. of Applied Polym. Sci.*, 2006, vol. 99 pp. 659-669.

Noll, Walter; "Chemie und Technologie Der Silikone"; Handbook; $2^{nd}$ Edition; 1968; pp. VIII-XII; Verlag Chemie GmbH, Weinheim, Bergstr., Germany.

Qi, Dong-Ming, et al., "Synthesis and Characterization of Poly(butyl acrylate)/Silica and Poly(butyl acrylate)/Silica/Poly(methyl methacrylate) Composite Particles," *J. of Applied Polym Sci.*, 2006, vol. 99, pp. 3425-3432.

International Search Report mailed Jun. 3, 2009.

\* cited by examiner

METHOD FOR PRODUCING COMPOSITE PARTICLES

CROSS REFERENCE TO RELATED APPLICATIONS

This application is the national stage filing of PCT application number EP2009/052249, filed Feb. 26, 2009, and claims priority of German patent application number 102008000584.3, filed Mar. 10, 2008, the entireties of which applications are incorporated herein by reference.

FIELD OF THE INVENTION

The present invention provides processes for producing composite particles based on soluble organic polymers and silicon compounds, to the products obtainable by the processes, and to the use thereof, for example, as an additive, binder or cobinder for different applications.

BACKGROUND OF THE INVENTION

Composite particles contain organic and inorganic domains, for example an organic polymer matrix and inorganic particles fixed thereto, and typically have a diameter of 4 to 5000 nm.

In common processes for producing composite particles, organic monomers are polymerized by means of emulsion polymerization in aqueous dispersions of inorganic particles, which anchors organic domains on the surface of the inorganic particles, as described, for example, in Dong-Ming Qi, J. of Applied Polym. Sci., 2006, Vol. 99, pages 3425 to 3432; Tsutomu Mizutani, J. of Applied Polym. Sci., 2006, Vol. 99, pages 659 to 669; Frank Bauer, Macromol. Mater. Eng., 2006291, pages 493 to 498, or in DE-A 10 2004 010 155, U.S. Pat. No. 3,544,500, U.S. Pat. No. 4,421,660 or WO-A 2006/072464.

However, the fixing of the organic and inorganic domains of the composite particles and the provision of stable composite particles present problems. This is because the inorganic particles or starting materials thereof and the organic monomers or the organic polymer matrices usually have different polarities and tend to separate from one another or agglomerate with one another.

If such an agglomeration occurs before or during the production of the composite particles, for example, the agglomerated inorganic particles are encapsulated by the organic polymer matrix in the course of polymerization of the organic monomers, such that there is no homogeneous fixing of inorganic particles on the organic polymer matrix, and hence there is ultimately no formation of chemically homogeneous composite particles formed from organic and inorganic domains. Corresponding mixtures are not in the form of colloidal primary particles in solvents. It may even be the case that the inorganic particles and the organic polymer matrix are present alongside one another as a blend.

However, there may also be agglomeration of the inorganic or organic domains in composite particles formed homogeneously from inorganic and organic domains, which lead to inadequate storage stability, especially of dissolved, emulsified or dispersed composite particles, and is manifested by gelation or spot formation. Especially at relatively high temperatures, for example from 40° C., such agglomeration occurs. Aqueous dispersions of particles formed exclusively from inorganic units, for example colloidal silica or organopolysiloxanes, likewise tend to agglomerate at relatively high temperatures, for example at 70° C., or even at room temperature.

Agglomerated composite particles no longer have the desired performance properties or are completely unusable. In order to provide, for example, stable aqueous dispersions of composite particles, typically emulsifiers, protective colloids or specific additives are added as stabilizers, for example the hydroxyl-containing alkylamino compounds recommended in DE-A 10 2004 010 155.

SUMMARY OF THE INVENTION

It was an object of the present invention to provide processes for producing composite particles, with which the abovementioned disadvantages are avoided, and with which especially composite particles which are also storage-stable in the form of dispersions are obtainable, ideally even without use of stabilizers.

The object is surprisingly achieved by processes in which hydrolyzable or OH-containing silicon compounds have been condensed in the presence of soluble polymers, wherein inorganic particles have been fixed to the soluble polymers.

DETAILED DESCRIPTION OF THE INVENTION

Known composite particles are obtained by free-radically initiated copolymerization of ethylenically unsaturated organic monomers and ethylenically unsaturated inorganic particles, for example the ethylenically unsaturated siloxanes proposed in EP-A 1620271.

WO-A 2007/057382 describes silane-modified polyvinyl alcohols which are obtained by free-radically initiated polymerization of ethylenically unsaturated silane-containing monomers in the presence of polyvinyl alcohols.

DE-A 102007038333 discloses compositions which have been prepared by condensation of silicon compounds in the presence of polyvinyl alcohols, although the inorganic particles formed had not been fixed on polyvinyl alcohols but were present alongside them in the composition as a blend.

EP-A 1243619 discloses composite materials consisting of organic domains such as polyacrylic acid, and inorganic domains, for example sodium silicates or colloidal silica, wherein the organic and inorganic domains are joined by ionic interactions with divalent metal cations, such that the composite materials are present as aggregates of the polymeric domains in the form of gels.

The invention provides processes for producing composite particles, characterized in that α) one or more silicon compounds of the general formula $$(RO)_n SiR^1_{4-n} \qquad (1)$$ in which R is an optionally substituted alkyl or aryl radical having 1 to 20 carbon atoms or a hydrogen atom, $R^1$ is an optionally substituted hydrocarbon radical or a hydrogen atom, and n is from 1 to 4, or β) one or more condensation products of the silicon compounds of the formula (1)

are condensed in a solvent or a mixture of two or more solvents in the presence of one or more soluble polymers, said soluble polymers being obtainable by free-radically initiated polymerization of a) one or more ethylenically unsaturated monomers having one or more further functional groups selected from the group comprising carboxylic acid groups or derivatives thereof, silane, sulfo, sulfate, phosphate, phosphonate, isocyanate, amine, quaternized amine, hydrazine, epoxy, ether, hydroxyl or CO groups, and b) one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins and dienes, vinylaromatics and vinyl halides, and condensation products formed from the silicon compounds α) or condensation products β), or condensation products thereof, are fixed on one or more soluble polymers.

In the silicon compounds of the formula (1), the R radicals are preferably unsubstituted. The R radical of the formula (1) is more preferably methyl, ethyl or propyl, cyclohexyl, phenyl, most preferably methyl or ethyl.

The $R^1$ radical is preferably an alkyl or aryl radical, more preferably methyl, ethyl, propyl, cyclohexyl, isooctyl or phenyl, and most preferably methyl or ethyl.

The $R^1$ radical is preferably also an $R^2X$ group in which the $R^2$ radical is an optionally substituted alkylene radical having 1 to 20 carbon atoms, preferably having 1 to 6 carbon atoms, in which nonadjacent methylene units may be replaced by —O— groups, and X is bonded to the $R^2$ radical via a covalent bond and is an amino radical $NHR^3$, an epoxy radical $CR^4(O)CR^5R^6$, a urethane radical $NR^3$—C(=O)$OR^3$, a urea radical $NR^3$—C(=O)$NR^3R^4$, a phospho radical $P(=O)(OH)_2$, an anhydride radical $C(=O)O(O=)CR^3$ or a carboxylic acid radical, where $R^3$ is a hydrogen atom or an optionally substituted alkyl, aryl or aminoalkyl radical having 1 to 10 carbon atoms, $R^4$, $R^5$, $R^6$ are each a hydrogen atom or an optionally substituted alkyl or aryl radical having 1 to 10 carbon atoms, where the particular $R^2$, $R^3$, $R^4$, $R^5$ and $R^6$ radicals are each selected independently of one another, and where the $R^2X$ group is bonded to the silicon atom of the formula (1) via a carbon atom of the $R^2$ radical.

The $R^2$ radicals of the $R^2X$ group are preferably unsubstituted. $R^2$ is more preferably an alkylene radical having 1 to 6 carbon atoms, most preferably methylene, ethylene or propylene.

$R^3$ is preferably a hydrogen atom, an alkyl, aryl or aminoalkyl radical having 1 to 6 carbon atoms, more preferably a hydrogen atom, 2-aminoethyl, phenyl, cyclohexyl, methyl, ethyl, propyl or butyl.

The $R^4$, $R^5$, $R^6$ radicals are preferably each a hydrogen atom.

n preferably assumes a value of 2 to 4, more preferably the value of 3 or 4.

The individual R, $R^2$, $R^3$, $R^4$, $R^5$, $R^6$ and X radicals and the value n of the silicon compounds of the formula (1) are each defined independently of one another. In all embodiments of the formula (1), the silicon atom is tetravalent.

Examples of silanes of the formula (1) are tetramethoxysilane, tetraethoxysilane, methyltrimethoxysilane, methyltriethoxysilane, dimethyldimethoxysilane, dimethyldiethoxysilane, isooctyltrimethoxysilane, isooctyltriethoxysilane, (cyclohexyl)methyldimethoxysilane, dicyclopentyldimethoxysilane or phenyltriethoxysilane. Preferred silanes of the formula (1) are tetramethoxysilane, tetraethoxysilane, methyltrimethoxysilane, methyltriethoxysilane, isooctyltrimethoxysilane, isooctyltriethoxysilane or phenyltriethoxysilane. Particular preference is given to tetramethoxysilane, tetraethoxysilane, methyltrimethoxysilane, methyltriethoxysilane.

Further examples of silanes of the formula (1) are (3-aminopropyl)triethoxysilane, (3-aminopropyl)trimethoxysilane, N-(2-aminoethyl)(3-aminopropyl)triethoxysilane, N-(2-aminoethyl)(3-aminopropyl)trimethoxysilane, N-(2-aminoethyl) (3-aminopropyl)methyldimethoxysilane, 3-(triethoxysilyl)propylsuccinic anhydride, N-cyclohexylaminomethylmethyldiethoxysilane, N-(3-(triethoxysilyl)propyl)methylurethane, N-(3-(trimethoxysilyl)propyl)methylurethane, N-(3-(triethoxysilyl)propyl)urea, N-(3-(trimethoxysilyl)propyl)urea, (3-glycidoxypropyl)triethoxysilane and (3-glycidoxypropyl)trimethoxysilane. Preference is also given to (3-aminopropyl)triethoxysilane or (3-glycidoxypropyl)triethoxysilane.

In the production of the composite particles, preference is given to using at least one silicon compound of the formula (1) in which n assumes a value of 1 to 3, i.e. in which the silicon atom is not substituted exclusively by alkoxy, aryloxy or hydroxyl groups.

Optionally, in the condensation to produce the composite particles, it is additionally possible to use one or more ethylenically unsaturated silicon compounds of the general formula (2) $R^7SiR^8_{0-2}(OR^9)_{1-3}$ in which $R^7$ is defined as $CH_2=CR^{19}—(CH_2)_{0-1}$ or $CH_2=CR^{10}CO_2(CH_2)_{1-3}$, $R^8$ is defined as $C_1$- to $C_3$-alkyl radical, $C_1$- to $C_3$-alkoxy radical or halogen, preferably Cl or Br, $R^9$ is an unbranched or branched, optionally substituted alkyl radical having 1 to 12 carbon atoms, preferably 1 to 3 carbon atoms, or an acyl radical having 2 to 12 carbon atoms, where $R^9$ may optionally be interrupted by an ether group, and $R^{10}$ is H or $CH_3$.

Preferred ethylenically unsaturated silicon compounds of the formula (2) are γ-acryloyl- or γ-methacryloyloxypropyltri(alkoxy)silanes, α-methacryloyloxymethyltri(alkoxy)silanes, γ-methacryloyloxypropylmethyldi(alkoxy)silanes, vinylsilanes such as vinylalkyldi(alkoxy)silanes and vinyltri(alkoxy)silanes, where the alkoxyl groups used may, for example, be methoxy, ethoxy, methoxyethylene, ethoxyethylene, methoxy propylene glycol ether or ethoxy propylene glycol ether radicals. Examples of preferred unsaturated silicon compounds of the formula (2) are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy) isopropoxysilane, vinyltributoxysilane, vinyltriacetoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified vinylsilanes.

Particularly preferred ethylenically unsaturated silicon compounds of the formula (2) are vinyltrimethoxysilane, vinylmethyldimethoxysilane vinyltriethoxysilane, vinylmethyldiethoxysilane, vinyltris(1-methoxy)isopropoxysilane, methacryloyloxypropyl-tris(2-methoxyethoxy)silane, 3-methacryloyloxypropyltrimethoxysilane, 3-methacryloyloxypropylmethyldimethoxysilane and methacryloyloxymethyltrimethoxysilane, and mixtures thereof.

In addition, in the condensation to produce the composite particles, it is possible to use one or more ethylenically unsaturated silicon compounds of the general formula (3) $CH_2=CR^{11}-CO-NR^{12}-R^{13}-SiR^{14}{}_n-(R^{15})_{3-m}$ in which n=0 to 4, m=0 to 2, $R^{11}$ is either H or a methyl group, $R^{12}$ is H or an alkyl group having 1 to 5 carbon atoms, $R^{13}$ is an alkylene group having 1 to 5 carbon atoms or a bivalent organic group in which the carbon chain is interrupted by an oxygen or nitrogen atom, $R^{14}$ is an alkyl group having 1 to 5 carbon atoms, $R^{15}$ is an alkoxy group which has 1 to 40 carbon atoms and may be substituted by further heterocycles. In silicon compounds of the formula (3) in which 2 or more $R^{11}$ or $R^{15}$ groups occur, the latter may be identical or different.

Examples of silicon compounds of the formula (3) are: 3-(meth)acrylamidopropyltrimethoxysilane, 3-(meth)-acrylamidopropyltriethoxysilane, 3-(meth)acrylamidopropyltri(β-methoxyethoxy)silane, 2-(meth)acrylamido-2-methylpropyltrimethoxysilane, 2-(meth)acrylamido-2-methylethyltrimethoxysilane, N-(2-(meth)acrylamidoethyl)aminopropyltrimethoxysilane, 3-(meth)acrylamidopropyltriacetoxysilane, 2-(meth)acrylamidoethyltrimethoxysilane, 1-(meth)acrylamidomethyltrimethoxysilane, 3-(meth)acrylamidopropylmethyldimethoxysilane, 3-(meth)acrylamidopropyldimethylmethoxysilane, 3-(N-methyl(meth)acrylamido)propyltrimethoxysilane, 3-(meth)acrylamidomethoxy)-3-hydroxypropyltrimethoxysilane, 3-((meth)acrylamidomethoxy)propyltrimethoxysilane, N,N-dimethyl-N-trimethoxysilylpropyl-3-(meth)-acrylamidopropylammonium chloride and N,N-dimethyl-N-trimethoxysilylpropyl-2-(meth)acrylamido-2-methylpropylammonium chloride.

The condensation products β used in the process according to the invention are preferably organopolysiloxanes formed from units of the general formula

$$R^1{}_x Si(OR)_y O_{(4-x-y)/2} \quad (4)$$ in which x is 0, 1, 2 or 3 and y is 0, 1 or 2, with the proviso that the sum of x+y≤3, $R^1$ may be the same or different and may be as defined above for the formula (1), and R may be the same or different and may be as defined above for the formula (1).

Preferred, more preferred and most preferred R and $R^1$ radicals are the same radicals as listed correspondingly above for the formula (1).

The particle size of the organopolysiloxanes is preferably from 4 to 900 nm, more preferably 4 to 40 nm and most preferably 4 to 30 nm (determined by means of transelectron microscopy; with the Libra 120 system from Zeiss).

The silicon compounds α), the condensation products β) and the silicon compounds of the formulae (2) and (3) are also referred to collectively hereinafter as silicon components.

In the production of the composite particles, the proportion of the silicon components is preferably 2 to 97% by weight, more preferably 20 to 95% by weight, most preferably 40 to 65% by weight, based in each case on the dry mass of the total amount of soluble polymers and silicon components used.

The silicon compounds α) or the condensation products β) are used overall in the production of the composite particles preferably in amounts of 20 to 100% by weight and more preferably of 60 to 80% by weight, based in each case on the dry mass of the total amounts of silicon components used.

The silicon compounds of the formulae (2) and (3) are each independently used preferably in amounts of 0 to 40% by weight, based in each case on the dry mass of the total amount of silicon components used.

The silicon components are commercial products or producible by standard methods, as described, for example, in Noll, Chemie and Technologie der Silikone [Chemistry and Technology of the Silicones], $2^{nd}$ edition 1968, Weinheim, or in Houben-Weyl, Methoden der organischen Chemie [Methods of Organic Chemistry], volume E20, Georg Thieme Verlag, Stuttgart (1987).

The solvents used for the process according to the invention may be water or an organic solvent, optionally in combination with water, or a solvent mixture of two or more organic solvents, optionally in combination with water. Use of water as a solvent or as a component of the solvent mixture is not absolutely necessary, since the residual water present in the commercially available starting materials is sufficient for performance of the process according to the invention.

Suitable organic solvents are, for example, alcohols having 1 to 6 carbon atoms, such as methanol, ethanol, n-propanol or i-propanol, ketones, such as acetone or methyl ethyl ketone, esters, such as methyl acetate, ethyl acetate, propyl acetate or butyl acetate. Preferred solvents are water or i-propanol.

Preferred solvent mixtures comprise water and i-propanol.

The soluble polymers are soluble in the particular inventive solvent or solvent mixture at any temperature within the temperature range from 1 to 100° C., preferably from 20 to 60° C., and at any pH between 2 and 12, preferably in an amount of at least 1 g per liter of solvent or solvent mixture. The inventive solutions with a solids content of soluble polymers of 10% by weight have a turbidity of preferably ≤600 EBC (according to formazin standard to DIN 38404; determined with the TA6FS/model 251 turbidimeter from Metrisa GmbH). Owing to the solubility properties, separation and aggregation of the soluble polymers in the course of production of the composite particles is suppressed.

Derivatives of carboxylic acid groups are, for example, esters, amides, nitriles or anhydrides.

The preferred functional groups of the monomers a) are selected from the group comprising carboxylic acid groups or derivatives thereof, such as esters, amides, nitriles or anhydrides, and silane, sulfo, epoxy, ether, hydroxyl or CO groups.

The monomers a) typically have 2 to 15 carbon atoms.

Examples of monomers a) are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as diethyl and diisopropyl esters, and also maleic anhydride, ethylenically unsaturated sulfonic acids or salts thereof, preferably vinyl sulfonic acid, 2-acrylamido-2-methylpropanesulfonic acid; ethylenically unsaturated epoxides such as glycidyl methacrylate or glycidyl acrylate; ethylenically unsaturated silanes such as the silicon compounds of the above-specified formulae (2) or (3), for example acryloyloxypropyltri(alkoxy)- or methacryloyloxypropyltri(alkoxy)silanes, vinyltrialkoxysilanes or vinylmethyldialkoxysilanes, where the alkoxy groups present may, for example, be methoxy, ethoxy and ethoxy propylene glycol ether radicals; ethylenically unsaturated hydroxyl or keto compounds, for example hydroxyalkyl methacrylates and acrylates, such as hydroxyethyl, hydroxypropyl or hydroxybutyl acrylate or methacrylate, and compounds such as diacetoneacrylamide and acetylacetoxyethyl acrylate or methacrylate; or vinyl ethers such as methyl, ethyl or isobutyl vinyl ether.

Particularly preferred monomers a) are ethylenically unsaturated monocarboxylic acids, such as especially methacrylic acid or acrylic acid, vinyltrialkoxysilanes, such as especially vinyltriethoxysilane, hydroxyethyl or hydroxypropyl acrylate or methacrylate.

To prepare the soluble polymers, preferably 0.1 to 30% by weight, more preferably 3 to 30% by weight and most preferably 6 to 15% by weight of monomers a) are used, based on the total weight of the monomers used overall in the polymerization to prepare the soluble polymers.

When the monomers a) used are ethylenically unsaturated silanes, they are preferably used in amounts of 0.1 to 5% by weight and more preferably 0.3 to 2% by weight, based on the total weight of the monomers used overall in the polymerization to prepare the soluble polymers.

Preferred vinyl esters among the monomers b) are vinyl acetate, vinyl propionate, vinyl butyrate, vinyl-2-ethylhexanoate, vinyl laurate, 1-methylvinyl acetate, vinyl pivalate and vinyl esters of alpha-branched monocarboxylic acids having 5 to 13 carbon atoms, for example VeoVa9R or VeoVa10R (trade name of Shell). Particular preference is given to vinyl acetate.

Preferred methacrylic acids or acrylic esters are esters of unbranched or branched alcohols having 1 to carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinylaromatics are styrene and vinyltoluene. A particularly preferred vinyl halide is vinyl chloride.

The preferred monomers b) thus do not include any monomers a).

Examples of suitable soluble polymers are (meth)acrylate polymers, styrene-(meth)acrylate polymers, vinyl ester polymers, each of which contain one or more different units of monomers a) having one or more further functional groups selected from the group comprising carboxylic acid groups or derivatives thereof, such as esters, amides, nitriles or anhydrides, and silane, sulfo, epoxy, ether, hydroxyl or CO groups.

Preferred soluble polymers are polymers of vinyl esters, especially vinyl acetate, with 6 to 15% by weight of ethylenically unsaturated carboxylic acids, such as acrylic acid or methacrylic acid, and optionally 0.3 to 2% by weight of ethylenically unsaturated silanes, such as vinyltrimethoxysilane, vinyltriethoxysilane, vinylmethyldimethoxysilane or vinylmethyldiethoxysilane; polymers of vinyl esters, especially vinyl acetate, with 0.3 to 2% by weight of ethylenically unsaturated silanes, such as vinyltrimethoxysilane, vinyltriethoxysilane, vinylmethyldimethoxysilane or vinylmethyldiethoxysilane; where the figures in % by weight add up to 100% by weight in each case.

Preferred soluble polymers are also polymers of (meth)acrylic esters, such as methyl (meth)acrylate and/or n-butyl (meth)acrylate, with 6 to 15% by weight of ethylenically unsaturated carboxylic acids, such as acrylic acid or methacrylic acid, and optionally 0.3 to 2% by weight of ethylenically unsaturated silanes, such as vinyltrimethoxysilane, vinyltriethoxysilane, vinylmethyldimethoxysilane or vinylmethyldiethoxysilane; polymers of (meth)acrylic esters, such as methyl (meth)acrylate and/or n-butyl (meth)acrylate, with 0.3 to 2% by weight of ethylenically unsaturated silanes, such as vinyltrimethoxysilane, vinyltriethoxysilane, vinylmethyldimethoxysilane or vinylmethyldiethoxysilane; where the figures in % by weight add up to 100% by weight in each case.

The monomers and the proportions by weight of the comonomers are generally selected so as to result in a glass transition temperature Tg of −50° C. to +50° C., preferably −30° C. to +40° C. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956) $1/Tg=x_1/Tg_1+x_2/Tg_2+\ldots+x_n/Tg_n$, where $x_n$ is the mass fraction (% by weight/100) of the monomer n, and $Tg_n$ is the glass transition temperature in kelvin of the homopolymer of the monomer n. Tg values for homopolymers are listed in the Polymer Handbook 2nd Edition, J. Wiley & Sons, New York (1975).

The soluble polymers based on the monomers a) and b) can be prepared by suspension, solvent, bulk or preferably emulsion polymerization processes known to those skilled in the art, as described, for example, in DE-A 102006050336. The emulsion polymerization process is preferably performed at a pH between 3 and 6.

In addition to the soluble polymers based on the monomers a) and b), it is also possible to use functionalized, partly or fully hydrolyzed polyvinyl alcohols in the process according to the invention, which are obtainable by hydrolyzing those soluble polymers whose monomer units b) derive exclusively or partly from vinyl esters. The functionalized, partly or fully hydrolyzed polyvinyl alcohols are produced by common processes, by hydrolyzing the soluble polymers containing vinyl ester units in alcoholic solution, analogously to the manner described, for example, in DE-A 10140131.

In addition to soluble polymers based on the monomers a) and b), it is also possible in the process according to the invention to use silane-modified polyvinyl alcohols which are obtained by treating vinyl alcohol polymers with one or more silicon compounds of the formulae (2) or (3) at elevated temperature, such as ≥30° C. or preferably 50° C. to 100° C. Preference is given to using 1 to 25% by weight of silicon compounds of the formulae (2) or (3), based on the weight of the vinyl alcohol polymer. Such silane-modified polyvinyl alcohols and the preparation thereof are described in WO-A 2007/057382. The vinyl alcohol polymers used to prepare the silane-modified polyvinyl alcohols are obtainable by hydrolyzing polyvinyl esters based on one or more of the vinyl esters listed under the monomers b), preferably vinyl acetate, and optionally one or more further monomers b) other than vinyl esters, and optionally one or more monomers a).

Preferred silicon compounds of the formulae (2) or (3) for treatment of the vinyl alcohol polymers for the preparation of the silane-modified polyvinyl alcohols are the same as correspondingly listed above for the condensation reaction. Preferred functionalized, partly or fully hydrolyzed polyvinyl alcohols are obtainable, for example, by treatment of vinyl alcohol polymers with vinyltrimethoxysilane or vinyltriethoxysilane.

Suitable functionalized, partly or fully hydrolyzed polyvinyl alcohols or vinyl alcohol polymers for the preparation of the silane-modified polyvinyl alcohols have a degree of hydrolysis of the vinyl ester units of preferably 50 mol % to 99.99 mol %, more preferably of 70 mol % to 99 mol %, most preferably of ≥96 mol %. Fully hydrolyzed polymers refer to those whose degree of hydrolysis is ≥96 mol %. Partly hydrolyzed vinyl ester polymers are understood to mean those with a degree of hydrolysis of >50 mol % and <96 mol %.

In addition to the soluble polymers based on monomers a) and b), it is also possible in the process according to the invention to use functionalized polyvinylacetals which are obtainable by partial or full acetalization of the functionalized, partly or fully hydrolyzed polyvinyl alcohols. The functionalized polyvinyl acetals are prepared by common processes, by acetalizing the polyvinyl alcohols mentioned with aldehydes, as described, for example, in DE-A 10140131.

Preferred aldehydes from the group of the aliphatic aldehydes having 1 to 15 carbon atoms are formaldehyde, acetaldehyde, propionaldehyde, and most preferably butyraldehyde or a mixture of butyraldehyde and acetaldehyde. The aromatic aldehydes used may, for example, be benzaldehyde or derivatives thereof.

The degree of acetalization of the functionalized polyvinylacetals can be adjusted by the amount of aldehyde used. Because the acetalization proceeds with almost complete conversion, the amount added can be determined by simple stoichiometric calculation.

In addition to the soluble polymers based on the monomers a) and b), it is also possible to use natural polymers or chemically or physically modified natural polymers. Examples of natural polymers are cellulose, starch, xanthans or polylactides.

In the production of the composite particles, the proportion of the soluble polymers is preferably 3 to 98% by weight, more preferably 5 to 80% by weight and most preferably 35 to 60% by weight, based in each case on the dry mass of the amount of soluble polymers and silicon components used overall.

In the process according to the invention, the silicon components and the soluble polymers can be used in pure form or in a solvent. The silicon components and the soluble polymers can be initially charged completely in a solvent for the condensation. Alternatively, a portion of the silicon components and of the soluble polymers can be initially charged for the condensation, and the remainder of the silicon components and of the soluble polymers can be added during the condensation. When all or some of the silicon components are initially charged and the soluble polymers are added at a later time, a preliminary condensation of the silicon components can proceed before the particles formed are fixed to the soluble polymers. The soluble polymers are preferably initially charged in a solvent or a solvent mixture, and some or all of the silicon components are added in pure form during the condensation.

The temperature during the condensation is preferably 1 to 100° C., more preferably 10 to 80° C. and most preferably 20 to 60° C. The reaction time of the condensation is preferably 4 to 24 hours, more preferably 5 to 12 hours.

The process for producing the composite particles is preferably performed at pH values between 2 and 12, more preferably at pH values between 7 and 12 and most preferably at pH values between 8 and 10. In the case that the silicon compounds of the formula (1) which bear one or more epoxy radicals are used, the composite particles are produced preferably at pH values of 4 to 7.

The pH value can be adjusted in a known manner by means of organic or inorganic acids, bases or buffers, for example by adding hydrochloric acid, ammonia or alkali metal hydroxides, for example sodium hydroxide solution. The pH can also be adjusted by means of the silicon compounds of the formula (1) and, if appropriate, of the silicon compounds of the formula (3), if the silicon compounds mentioned bear an amino, ammonium, carboxylic acid or phospho radical. Preferably, no polyvalent ions, such as multiply charged metal ions, for example alkaline earth metal ions, are introduced into the composite particles as acids, bases or buffers, since such ions can lead to aggregation of composite particles and hence to gelation of the composite particles.

The acids, bases or buffers mentioned may also be used as a catalyst for the condensation of the silicon compounds of the formula (1) and optionally of the formulae (2) and (3).

During the condensation, it is possible to use emulsifiers. When the condensation is performed in the presence of emulsifiers, the amount thereof is preferably 1 to 5% by weight, based on the solids content. Suitable emulsifiers are anionic, cationic and nonionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units. Preferably, no emulsifiers are added before, during or after the condensation.

The composite particles thus obtainable are in the form of a dispersion and preferably have a solids content of 10 to 65% by weight, more preferably of 10 to 50% by weight, even more preferably of 20 to 40% by weight and most preferably of 25 to 35% by weight.

On completion of the condensation reaction, by-products, unconverted starting materials, solvents or other volatile substances can be removed by means of distillation, preferably under reduced pressure, and optionally while passing entraining gases through or over, such as air, nitrogen or water vapor.

To produce the composite particles in the form of powders, the dispersions of the composite particles are dried, optionally with addition of protective colloids as a drying aid. Suitable drying processes are, for example, fluidized bed drying, roller drying, freeze-drying or spray-drying. Suitable drying assistants are, for example, the abovementioned soluble polymers. Preference is given to using polyvinyl alcohols as drying assistants. Preference is given to spray-drying the aqueous mixtures. The spray-drying is effected in customary spray-drying systems, wherein the atomization can be effected by means of one-substance, two-substance or multisubstance nozzles, or with a rotating disk. The exit temperature is generally selected within the range from 45° C. to 120° C., preferably between 60° C. and 90° C.

For the drying, a content of up to 1.5% by weight of antifoam, based on the polymeric constituents, has been found to be favorable in many cases. To increase the storability by improving the blocking stability, especially in the case of powders with low glass transition temperature, the powder obtained can be modified with an antiblocking agent (anticaking agent), preferably up to 30% by weight, based on the total weight of polymeric constituents. Examples of antiblocking agents are calcium carbonate or magnesium carbonate, talc, gypsum, silicas, for example finely divided silicas, kaolins, metakaolin, calcined kaolin, silicates with particle sizes preferably in the range from 10 nm to 100 μm.

The viscosity of the dispersion to be dried is adjusted via the solids content so as to obtain a value of <1500 mPas (Brookfield viscosity at 20 revolutions and 23° C.), preferably <500 mPas.

To improve the performance properties, further additives can be added to the composite particles.

Further constituents of the composite particles, present in preferred embodiments, are, for example, binders, pigments, fillers, for example zeolites, foam stabilizers, hydrophobing agents or air pore formers. These additives are preferably added during or after the drying of the dispersion.

The composite particles thus obtained in the form of powders can be converted to the desired form by subsequent grinding and/or redispersion in water, organic solvents or reactive diluents. Suitable reactive diluents are, for example, the ethylenically unsaturated substance classes and compounds listed above under the monomers a) or monomers b). Preferred reactive diluents are ethylenically unsaturated aromatics, such as styrene, (meth)acrylates, such as ethylene glycol dimethacrylate, or epoxides.

The invention further provides composite particles obtainable by condensation of α) one or more silicon compounds of the general formula

$$(RO)_n SiR^1_{4-n} \qquad (1)$$

in which R is an optionally substituted alkyl, aryl or alkoxyalkyl radical having 1 to 20 carbon atoms or a hydrogen atom, is an optionally substituted hydrocarbon radical having 1 to 12 carbon atoms or a hydrogen atom, and n is from 2 to 4, or β) one or more condensation products of the silicon compounds of the formula (1) in a solvent or a mixture of two or more solvents in the presence of one or more soluble polymers, said soluble polymers being obtainable by free-radically initiated polymerization of a) one or more ethylenically unsaturated monomers having one or more further functional groups selected from the group comprising carboxylic acid groups or derivatives thereof, silane, sulfo, sulfate, phosphate, phosphonate, isocyanate, amine, quaternized amine, hydrazine, epoxy, ether, hydroxyl or CO groups, and b) one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins and dienes, vinylaromatics and vinyl halides, condensation products formed from the silicon compounds α) or condensation products β) or condensation products thereof being fixed on one or more soluble polymers.

Especially the functional groups of the monomer units a) of the soluble polymers lead to fixing of the inorganic particles. The fixing is based essentially on chemical interaction, such as covalent bonds, or physical interaction, such as ionic bonds or hydrogen bonds. The inorganic particles are fixed essentially in random distribution on the polymer chain of the soluble polymer of the particular composite particle.

The composite particles preferably have a viscosity of 20 to 2000 mPas (Brookfield viscosity at 25° C. as a 25% solution in water).

The composite particles in the form of an aqueous dispersion with a solids content of 10% by weight have a turbidity of preferably ≤700 EBC, more preferably ≤600 EBC, even more preferably ≤400 EBC and most preferably ≤200 EBC (determination according to Formazin standard to DIN 38404 at room temperature with the Metrisa turbidimeter: TA6FS/ model 251).

The inorganic domains of the composite particles have mean particle sizes of preferably 5 nm to 800 nm, more preferably of 5 nm to 50 nm and most preferably of 5 nm to 30 nm (determined with the Libra 120 transelectron microscope from Zeiss).

In the course of the inventive condensation, preferably ≥30%, more preferably ≥40% and most preferably 70 to 80% of the hydrolyzable or condensable bonds of the silicon compounds of the formula (1) and optionally of the formulae (2) and (3), based on the total number of hydrolyzable or condensable bonds of the silicon compounds mentioned, are joined to the soluble polymers or the silicon compounds or condensation products thereof used. Hydrolyzable bonds are especially the alkoxy groups RO of the formula (1) or the alkoxy groups OR$^9$ of the formula (2). Condensable bonds are especially the OH groups bonded to silicon atoms.

The inventive composite particles are stable in organic solvents, reactive diluents or water or in the form of powders, even without addition of stabilizers, emulsifiers or protective colloids.

The composite particles are suitable as binders, cobinders or additives for improving the performance properties of many kinds of products. Use of the composite particles in coating materials or adhesives allows, for example, the thermal stability or scratch resistance thereof to be enhanced. Adhesives comprising composite particles frequently additionally exhibit improved flow performance and a stable modulus of elasticity at elevated temperature, and give rise on application, for example, to removable adhesive films. With coating materials comprising composite particles, it is possible to provide coatings with a matt effect. It is equally possible to use the composite particles in formulations for powder coatings, polymer materials and composite materials, for example for production of polymer components, composite components or packaging materials. The composite particles are also suitable for surface treatment for synthetic or natural materials, such as fibers or particles, such as preferably stone, wood, leather, paper, textiles, plastics, such as plastic films. In this case, the composite particles act, for example, as primers for promoting adhesion, as a barrier layer, to prevent corrosion or to repel soil. The soil-repellant effect can advantageously be exploited especially in corresponding applications in carpets including fitted carpets. The composite particles can also be used to produce noncombustible coatings for wood, plastics, leather and paper. Stone may be reinforced or renovated. In products in the packaging industry, addition of the composite particles can generate a gas barrier.

The examples which follow serve to illustrate the invention in detail, and should in no way be interpreted as a restriction.

EXAMPLES

Preparation of the Soluble Polymers

Polymer 1:

A reactor of capacity 3 liters was initially charged with 839.4 g of deionized water, 3.1 g of sodium laurylsulfate, 0.93 g of potassium peroxodisulfate in a nitrogen atmosphere, which were heated to 40° C. while stirring. At this temperature, a mixture of the following composition was added to the reactor:

| | |
|---|---|
| Vinyltriethoxysilane | 0.7 g |
| Methacrylic acid | 11.9 g |
| Butyl acrylate | 66.8 g |
| Dodecyl mercaptan | 1.0 g |
| Methyl methacrylate | 69.0 g |

Subsequently, the temperature was increased to 80° C. and, on attainment of this temperature, the initiator solution (0.93 g of potassium peroxodisulfate in 98 g of water) was metered in within 3 hours and, at the same time, a solution with the following composition was added to the reactor separately over the course of 2.5 hours:

| Vinyltriethoxysilane: | 2.3 g |
| Methacrylic acid: | 37.6 g |
| Butyl acrylate: | 211.5 g |
| Dodecyl mercaptan: | 3.3 g |
| Methyl methacrylate: | 218.5 g |

After the end of the metered additions, the mixture was stirred at 80° C. for 2 hours and at 85° C. for 1 hour. Subsequently, the polymer dispersion was diluted with water and the pH was adjusted to 9 with an aqueous ammonia solution (12.5%). A polymer solution with a solids content of 20% by weight was obtained. A 10% by weight solution of the polymer in water had a turbidity of <600 EBC at room temperature (according to formazin standard to DIN 38404; determined with the model TA6FS/model 251 turbidimeter from Metrisa GmbH).

Polymer 2:

Analogous to example 1, with the difference that no vinyltriethoxysilane was used. A 10% by weight solution of the polymer in water had a turbidity at room temperature of <600 EBC (according to formazin standard to DIN 38404; determined with the model TA6FS/model 251 turbidimeter from Metrisa GmbH).

Polymer 3:

The initial charge was heated to reflux temperature (75-80° C.) under a nitrogen atmosphere while stirring (100 rpm). 15 minutes after attainment of reflux temperature, 1.5 g of tert-butyl peroxypivalate (PPV) were added. 45 minutes after attainment of reflux temperature, solution 1 and solution 2 were each metered separately into the reactor over the course of 225 minutes.

| Initial charge: | 707.5 g of i-propanol, |
| | 71.7 g of vinyl acetate, |
| | 0.35 g of vinyltriethoxysilane, |
| | 0.84 g of PPV |
| Solution 1: | 671.6 g of vinyl acetate, |
| | 3.35 g of vinyltriethoxysilane |
| Solution 2: | 36.4 g of i-propanol |
| | 8.4 g of PPV |

30 minutes after the end of the metered additions, 2.0 g of PPV were added and the mixture was stirred at reflux for a further two hours. After cooling to room temperature, a polymer solution with a solids content of 50% by weight was obtained. A 10% by weight solution of the polymer in i-propanol had a turbidity at room temperature of <600 EBC (according to formazin standard to DIN 38404; determined with the model TA6FS/model 251 turbidimeter from Metrisa GmbH).

Preparation of Polysiloxanes:

Polysiloxane 1:

A mixture of 500 g of water and 200 g of tetraethoxysilane was prepared at 30° C. while stirring, and the pH was adjusted to 9 with ammonia. After 2 h, a clear solution had formed. The mixture was stirred at 30° C. for a further 8 h. Subsequently, the volatile components and a portion of the water were distilled off at 60° C. under reduced pressure, and the dispersion was cooled to room temperature and filtered (mesh size 70 micrometers). The dispersion thus obtained was stable, homogeneous and speck-free.

Polysiloxane 2:

A mixture of 500 g of water, 170 g of tetraethoxysilane and 30 g of trimethylethoxysilane was prepared at 30° C. while stirring, and the pH was adjusted to 9 with ammonia. After 2 h, a clear solution had formed. The mixture was stirred at 30° C. for a further 8 h. Subsequently, the volatile components and a portion of the water were distilled off at 60° C. under reduced pressure, and the dispersion was cooled to room temperature and filtered (mesh size 70 micrometers). The dispersion thus obtained was stable, homogeneous and speck-free.

Production of Composite Particles in the Form Aqueous Dispersions

Example 1

A jacketed reactor was initially charged at room temperature, while stirring, with 900 g of the 20% aqueous polymer solution of polymer 1, 197 g of water were added and the pH was adjusted to 9 with aqueous ammonia (12.5%). The mixture was heated to 35° C. and, after stirring for 10 minutes, 255 g of methyltriethoxysilane and 35 g of trimethylethoxysilane were added over the course of 20 minutes. The mixture was stirred at 35° C. for 4 hours and then at 60° C. for 2 hours. Finally, the volatile components of the reaction mixture and a portion of the water were distilled off at a pressure of 20 mbar and at a temperature of 60° C. A stable, homogeneous and speck-free dispersion of the composite particles was obtained.

The composite particles had a viscosity of 120 mPas (Brookfield viscosity at 25° C. as a 25% solution in water). A dispersion of the composite particles with a solids content of 10% by weight in water had a turbidity at room temperature of <600 EBC (according to formazin standard to DIN 38404; determined with the model TA6FS/model 251 turbidimeter from Metrisa GmbH). The inorganic domains of the composite particles had a mean particle size of <20 nm (determined with the Libra 120 transelectron microscope from Zeiss).

Example 2

Analogous to example 1, with the difference that 261 g of methyltriethoxysilane and 29 g of (3-aminopropyl)triethoxysilane were used in place of methyltriethoxysilane and trimethylethoxysilane.

A stable, homogeneous and speck-free dispersion of the composite particles was obtained.

The composite particles had a viscosity of 190 mPas (Brookfield viscosity at 25° C. as a 25% solution in water). A dispersion of the composite particles with a solids content of 10% by weight in water had a turbidity at room temperature of <600 EBC (according to formazin standard to DIN 38404; determined with the model TA6FS/model 251 turbidimeter from Metrisa GmbH). The inorganic domains of the composite particles had a mean particle size of <20 nm (determined with the Libra 120 transelectron microscope from Zeiss).

Example 3

Analogous to example 1, with the difference that 261 g of methyltriethoxysilane and 29 g of (3-glycidoxypropyl)triethoxysilane were used in place of methyltriethoxysilane and trimethylethoxysilane.

A stable, homogeneous and speck-free dispersion of the composite particles was obtained.

The composite particles had a viscosity of 2000 mPas (Brookfield viscosity at 25° C. as a 30% solution in water). A dispersion of the composite particles with a solids content of 10% by weight in water had a turbidity at room temperature of <600 EBC (according to formazin standard to DIN 38404; determined with the model TA6FS/model 251 turbidimeter from Metrisa GmbH). The inorganic domains of the composite particles had a mean particle size of <20 nm (determined with the Libra 120 transelectron microscope from Zeiss).

Example 4

Analogous to example 1, with the difference that the aqueous polymer solution of polymer 2 was used in place of the aqueous polymer solution of polymer 1.

A stable, homogeneous and speck-free dispersion of the composite particles was obtained.

The composite particles had a viscosity of 250 mPas (Brookfield viscosity at 25° C. as a 30% solution in water). A dispersion of the composite particles with a solids content of 10% by weight in water had a turbidity at room temperature of <600 EBC (according to formazin standard to DIN 38404; determined with the model TA6FS/model 251 turbidimeter from Metrisa GmbH). The inorganic domains of the composite particles had a mean particle size of <20 nm (determined with the Libra 120 transelectron microscope from Zeiss).

Example 5

A jacketed reactor was initially charged with 400 g of the 50% solution of polymer 3 in i-propanol while stirring, 400 g of i-propanol were added and the mixture was heated to 60° C. After stirring at 60° C. for 10 minutes, 110 g of methyltriethoxysilane and 35 g of α-methacrylatomethyltrimethoxysilane were metered in over the course of 20 minutes. On completion of the metered addition, the mixture was stirred at 60° C. for a further 14 hours. Subsequently, the volatile components and a portion of the i-propanol were distilled off at a pressure of 20 mbar and at a temperature of 60° C.

A stable, homogeneous and speck-free dispersion of the composite particles was obtained.

The composite particles had a viscosity of 280 mPas (Brookfield viscosity at 25° C. as a 30% solution in water). The inorganic domains of the composite particles had a mean particle size of <30 nm (determined with the Libra 120 transelectron microscope from Zeiss).

Comparative Example 6

Stability test: 50 g of the dispersion of the polysiloxane 1 were kept at 75° C. for 15 min and then studied for agglomeration under a light microscope. Significant agglomeration of particles was found.

Comparative Example 7

Stability test: 50 g of the dispersion of the polysiloxane 2 were kept at 75° C. for 15 min and then studied for agglomeration under a light microscope. Significant agglomeration of particles was found.

Example 8

A jacketed reactor was initially charged with 500 g of a dispersion of the polysiloxane 1 (SC=40% by weight) and 1500 g of the 20% aqueous solution of the polymer 1, the pH was adjusted to 9 with ammonia and the mixture was heated to 50° C. while stirring. After 6 hours at 50° C., the volatile components and a portion of the water were distilled off at 60° C. under reduced pressure, and the dispersion was cooled to room temperature and filtered (mesh size 70 micrometers).

A stable, homogeneous and speck-free dispersion of the composite particles was obtained.

The composite particles had a viscosity of 900 mPas (Brookfield viscosity at 25° C. as a 30% solution in water). The inorganic domains of the composite particles had a mean particle size of <20 nm (determined with the Libra 120 transelectron microscope from Zeiss).

To study the thermal stability, 50 g of the dispersion obtained were kept at 75° C. for 30 min and then studied under the light microscope for the agglomeration of composite particles. No agglomerate formation occurred.

Example 9

A jacketed reactor was initially charged with 500 g of a dispersion of the polysiloxane 2 (SC=40% by weight) and 1500 g of the 20% aqueous solution of the polymer 1, the pH was adjusted to 9 with ammonia and the mixture was heated to 50° C. while stirring. After 6 hours at 50° C., the volatile components and a portion of the water were distilled off at 60° C. under reduced pressure, and the dispersion was cooled to room temperature and filtered (mesh size 70 micrometers).

A stable, homogeneous and speck-free dispersion of the composite particles was obtained.

The composite particles had a viscosity of 1200 mPas (Brookfield viscosity at 25° C. as a 30% solution in water). The inorganic domains of the composite particles had a mean particle size of <20 nm (determined with the Libra 120 transelectron microscope from Zeiss).

To study the thermal stability, 50 g of the dispersion obtained were kept at 75° C. for 30 min and then studied under the light microscope for the agglomeration of composite particles. No agglomerate formation occurred.

The invention claimed is:
1. A process for producing composite particles, wherein
α) one or more silicon compounds of the general formula

$$(RO)_n SiR^1_{4-n} \quad (1)$$ in which

R is an optionally substituted alkyl or aryl radical having 1 to 20 carbon atoms or a hydrogen atom,
$R^1$ is an optionally substituted hydrocarbon radical or a hydrogen atom, and
n is from 1 to 4, or
β) one or more condensation products of the silicon compounds of the formula (1) are condensed in a solvent or a mixture of two or more solvents at a pH of 8 to 12 in the presence of one or more soluble polymers,
the soluble polymers used being
polymers of vinyl esters with 6 to 15% by weight of ethylenically unsaturated carboxylic acids and optionally 0.3 to 2% by weight of ethylenically unsaturated silanes; polymers of vinyl esters with 0.3 to 2% by weight of ethylenically unsaturated silanes; polymers of (meth)acrylic esters with 6 to 15% by weight of ethylenically unsaturated carboxylic acids and optionally 0.3 to 2% by weight of ethylenically unsaturated silanes; or polymers of (meth)acrylic esters with 0.3 to 2% by weight of ethylenically unsaturated silanes; where the figures in % by weight are based on the total weight of monomers used to prepare the soluble polymers, and
condensation products formed from the silicon compounds α, or condensation products β or condensation products thereof, are fixed on one or more soluble polymers, wherein
no multiply-charged metal ions are introduced into the composite particles.
2. The process for producing composite particles as claimed in claim 1, wherein the condensation products β) used are organopolysiloxanes formed from units of the general formula $$R^1{}_x Si(OR)_y O_{(4-x-y)/2} \quad (4)$$ in which x is 0, 1, 2 or 3 and y is 0, 1 or 2,
with the proviso that the sum of x+y≤3,
$R^1$ may be the same or different and is an optionally substituted hydrocarbon radical or a hydrogen atom, and
R may be the same or different and is an optionally substituted alkyl or aryl radical having 1 to 20 carbon atoms or a hydrogen atom.

3. The process for producing composite particles as claimed in claim 1, wherein the $R^1$ radical is an $R^2X$ group
in which the $R^2$ radical is an optionally substituted alkylene radical having 1 to 20 carbon atoms,
in which nonadjacent methylene units may be replaced by —O— groups, and
X is bonded to the $R^2$ radical via a covalent bond and is an amino radical $NHR^3$, an epoxy radical $CR^4(O)CR^5R^6$, a urethane radical $NR^3—C(=O)OR^3$, a urea radical $NR^3—C(=O)NR^3R^4$, a phospho radical $P(=O)(OH)_2$, an anhydride radical $C(=O)O(O=)CR^3$ or a carboxylic acid radical, where
$R^3$ is a hydrogen atom or an optionally substituted alkyl, aryl or aminoalkyl radical having 1 to 10 carbon atoms,
$R^4$, $R^5$, $R^6$ are each a hydrogen atom or an optionally substituted alkyl or aryl radical having 1 to 10 carbon atoms,
where the particular $R^2$, $R^3$, $R^4$, $R^5$ and $R^6$ radicals are each selected independently of one another, and
where the $R^2X$ group is bonded to the silicon atom of the formula (1) via a carbon atom of the $R^2$ radical.

4. The process for producing composite particles as claimed in claim 3, wherein $R^2$ has 1 to 6 carbon atoms.

5. The process for producing composite particles as claimed in claim 1, wherein the silicon compounds of the formula (1) used are tetramethoxysilane, tetraethoxysilane, methyltrimethoxysilane, methyltriethoxysilane, dimethyldimethoxysilane, dimethyldiethoxysilane, isooctyltrimethoxysilane, isooctyltriethoxysilane, (cyclohexyl)-methyldimethoxysilane, dicyclopentyldimethoxysilane, phenyltriethoxysilane, (3-aminopropyl)-triethoxysilane, (3-aminopropyl)trimethoxysilane, N-(2-aminoethyl)(3-aminopropyl)triethoxysilane, N-(2-aminoethyl)(3-aminopropyl)trimethoxysilane, N-(2-aminoethyl) (3-aminopropyl)-methyldimethoxysilane, 3-(triethoxysilyl)propylsuccinic anhydride, N-cyclohexylamino-methylmethyldiethoxysilane, N-(3-(triethoxysilyl)propyl)methylurethane, N-(3-(trimethoxy-silyl)propyl)methylurethane, N-(3-(triethoxysilyl) propyl)urea, N-(3-(trimethoxysilyl)-propyl)urea, (3-glycidoxypropyl)triethoxysilane or (3-glycidoxypropyl)trimethoxysilane.

6. The process for producing composite particles as claimed in claim 1, wherein one or more ethylenically unsaturated silicon compounds of the formula (2) $R^7 SiR^8{}_{0-2}(OR^9)_{1-3}$ are additionally used, in which $R^7$ is defined as $CH_2=CR^{10}—(CH_2)_{0-1}$ or $CH_2=CR^{10}CO_2(CH_2)_{1-3}$, $R^8$ is defined as $C_1$- to $C_3$-alkyl radical, $C_1$- to $C_3$-alkoxy radical or halogen, $R^9$ is an unbranched or branched, optionally substituted alkyl radical having 1 to 12 carbon atoms or an acyl radical having 2 to 12 carbon atoms, where $R^9$ may optionally be interrupted by an ether group, and $R^{10}$ is H or $CH_3$.

7. The process for producing composite particles as claimed in claim 1, wherein the solvent used is water, an organic solvent, an organic solvent in combination with water, a solvent mixture of two or more organic solvents or a solvent mixture of two or more organic solvents in combination with water.

8. The process for producing composite particles as claimed in claim 1, wherein silane-modified polyvinyl alcohols are additionally used, being obtainable by treating vinyl alcohol polymers with one or more ethylenically unsaturated silicon compounds of the formula (2) $R^7 SiR^8{}_{0-2}(OR^9)_{1-3}$ in which $R^7$ is defined as $CH_2=CR^{10}—(CH_2)_{0-1}$ or $CH_2=CR^{10}CO_2(CH_2)_{1-3}$, $R^8$ is defined as $C_1$- to $C_3$-alkyl radical, $C_1$- to $C_3$-alkoxy radical or halogen, $R^9$ is an unbranched or branched, optionally substituted alkyl radical having 1 to 12 carbon atoms or an acyl radical having 2 to 12 carbon atoms, where $R^9$ may optionally be interrupted by an ether group, and $R^{10}$ is H or $CH_3$, at elevated temperature.

* * * * *